(12) United States Patent
Park et al.

(10) Patent No.: US 8,836,892 B2
(45) Date of Patent: Sep. 16, 2014

(54) BACKLIGHT ASSEMBLY, LIQUID CRYSTAL DISPLAY HAVING THE BACKLIGHT ASSEMBLY AND METHOD OF MANUFACTURING THE LIQUID CRYSTAL DISPLAY

(75) Inventors: Se-Ki Park, Suwon-si (KR); Joo-Woan Cho, Asan-si (KR); Ho-Sik Shin, Anyang-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 542 days.

(21) Appl. No.: 12/512,767

(22) Filed: Jul. 30, 2009

(65) Prior Publication Data

US 2010/0103342 A1 Apr. 29, 2010

(30) Foreign Application Priority Data

Oct. 28, 2008 (KR) ........................ 10-2008-0106016

(51) Int. Cl.
| | |
|---|---|
| *G02F 1/1335* | (2006.01) |
| *H01L 33/00* | (2010.01) |
| *F21V 7/04* | (2006.01) |
| *H01L 29/18* | (2006.01) |
| *F21V 8/00* | (2006.01) |
| *G09G 3/36* | (2006.01) |

(52) U.S. Cl.
CPC ............ *G02B 6/0068* (2013.01); *G02B 6/0083* (2013.01); *G09G 3/3046* (2013.01); *G09G 3/3648* (2013.01)
USPC ................. 349/65; 349/61; 349/62; 362/612; 362/613; 362/555; 257/88

(58) Field of Classification Search
CPC ............................ G02B 6/0081; G02B 6/0073
USPC .......... 349/61–62, 64–65; 362/612–613, 555; 257/88; 345/39, 46, 112
See application file for complete search history.

(56) References Cited

U.S. PATENT DOCUMENTS 7,201,488 B2 4/2007 Sakamoto et al.
7,990,512 B2 * 8/2011 Yang .............................. 349/150
(Continued)

FOREIGN PATENT DOCUMENTS

| CN | 1661441 A | 8/2005 |
|---|---|---|
| CN | 101097054 A | 1/2008 |

(Continued)

OTHER PUBLICATIONS

English Translation of Chinese Office Action dated Oct. 9, 2012.

(Continued)

*Primary Examiner* — Hoan C Nguyen
(74) *Attorney, Agent, or Firm* — F. Chau & Associates, LLC

(57) ABSTRACT

A backlight assembly includes a waveguide plate guiding light, a first light-emitting module disposed on a first side of the waveguide plate, the first light-emitting module including a plurality of first light-emitting blocks, a second light-emitting module disposed on a second side of the waveguide plate, the second light-emitting module including a plurality of second light-emitting blocks, and a plurality of optical drivers controlling luminance levels of the first light-emitting blocks and the second light-emitting blocks, wherein at least one of the first light-emitting blocks, at least one of the second light-emitting blocks, and at least one of the optical drivers are connected to each other.

35 Claims, 14 Drawing Sheets

(56) References Cited

U.S. PATENT DOCUMENTS

| | | | |
|---|---|---|---|
| 8,031,294 B2 * | 10/2011 | Kim | 349/65 |
| 2005/0185394 A1 | 8/2005 | Sakamoto et al. | |
| 2007/0153155 A1 * | 7/2007 | Chung et al. | 349/58 |
| 2007/0236447 A1 * | 10/2007 | Lee et al. | 345/102 |
| 2008/0030650 A1 * | 2/2008 | Kitagawa et al. | 349/65 |
| 2008/0062116 A1 * | 3/2008 | Morbieu et al. | 345/102 |
| 2009/0128732 A1 * | 5/2009 | Hamada | 349/58 |

FOREIGN PATENT DOCUMENTS

| | | | |
|---|---|---|---|
| JP | 2002-279817 | | 9/2002 |
| JP | 2004252177 A | | 9/2004 |
| JP | 2005-017964 | | 1/2005 |
| JP | 2005-243267 | | 9/2005 |
| JP | 2006331869 | * | 12/2006 |
| JP | 2007-184291 | | 7/2007 |
| JP | WO2007/129419 A1 | | 11/2007 |
| KR | 1020070071753 A | | 7/2007 |

OTHER PUBLICATIONS

Japanese Office Action Dated Jul. 9, 2013.

Chinese Office Action Dated Oct. 28, 2013.

\* cited by examiner

BACKLIGHT ASSEMBLY, LIQUID CRYSTAL DISPLAY HAVING THE BACKLIGHT ASSEMBLY AND METHOD OF MANUFACTURING THE LIQUID CRYSTAL DISPLAY

CROSS-REFERENCE TO RELATED APPLICATION

This application claims priority from Korean Patent Application No. 10-2008-0106016 filed on Oct. 28, 2008, the disclosure of which is incorporated herein by reference in its entirety.

BACKGROUND OF THE INVENTION

1. Technical Field

The present disclosure relates to a backlight assembly, a liquid crystal display (LCD) having the backlight assembly and a method of manufacturing the LCD, and more particularly to a backlight assembly including light-emitting blocks, an LCD having the backlight assembly and a method of manufacturing the LCD.

2. Discussion of the Related Art

Liquid crystal displays include a first display panel having a plurality of pixel electrodes, a second display panel having a common electrode, and a liquid crystal panel having a dielectric-anisotropy liquid crystal layer interposed between the first and second display panels. An LCD may display an image by generating an electric field between the plurality of pixel electrodes and the common electrode, and adjusting the intensity of the electric field to control the amount of light transmitted through the liquid crystal panel. The LCD may include a plurality of light-emitting blocks as a light source.

Display quality of the LCD can be improved by controlling a luminance of the light-emitting blocks. However, the light-emitting blocks increase a thickness of the LCD. Therefore, a need exists for an improved backlight assembly including the light-emitting blocks.

SUMMARY OF THE INVENTION

According to an exemplary embodiment of the present invention, a backlight assembly includes a waveguide plate guiding light, a first light-emitting module disposed on one side of the waveguide plate and including a plurality of first light-emitting blocks, a second light-emitting module disposed on the other side of the waveguide plate and including a plurality of second light-emitting blocks, and a plurality of optical drivers controlling the luminance levels of the first light-emitting blocks and the second light-emitting blocks, wherein at least one of the first light-emitting blocks and at least one of the second light-emitting blocks are connected as a string by at least one of the optical drivers.

According to an exemplary embodiment of the present invention, an LCD includes a liquid crystal panel displaying an image, a waveguide plate disposed below the liquid crystal panel and guiding light to the liquid crystal panel, and a backlight assembly including a first light-emitting module, which is disposed on one side of the waveguide plate and includes a plurality of first light-emitting blocks, a second light-emitting module, which is disposed on the other side of the waveguide plate and includes a plurality of second light-emitting blocks, and a plurality of optical drivers, which control the luminance levels of the first light-emitting blocks and the second light-emitting blocks, wherein at least one of the first light-emitting blocks and at least one of the second light-emitting blocks are connected as a string by at least one of the optical drivers.

According an exemplary embodiment of the present invention, a method of manufacturing an LCD includes providing a liquid crystal panel, which displays an image, and a waveguide plate, which is disposed below the liquid crystal panel and guides light to the liquid crystal panel, disposing a first light-emitting module and a second light-emitting module on opposite sides of the waveguide plate, the first light-emitting module including a plurality of first light-emitting blocks providing light, and the second light-emitting module including a plurality of second first light-emitting blocks providing light, and forming a plurality of optical drivers controlling the luminance levels of the first light-emitting blocks and the second light-emitting blocks, at least one of the optical drivers connecting at least one of the first light-emitting blocks and at least one of the second light-emitting blocks as a string.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein.

It will be understood that when an element is referred to as being "connected" or "coupled" to another element it can be directly connected or coupled to the other element or intervening elements may be present.

Figure 1:
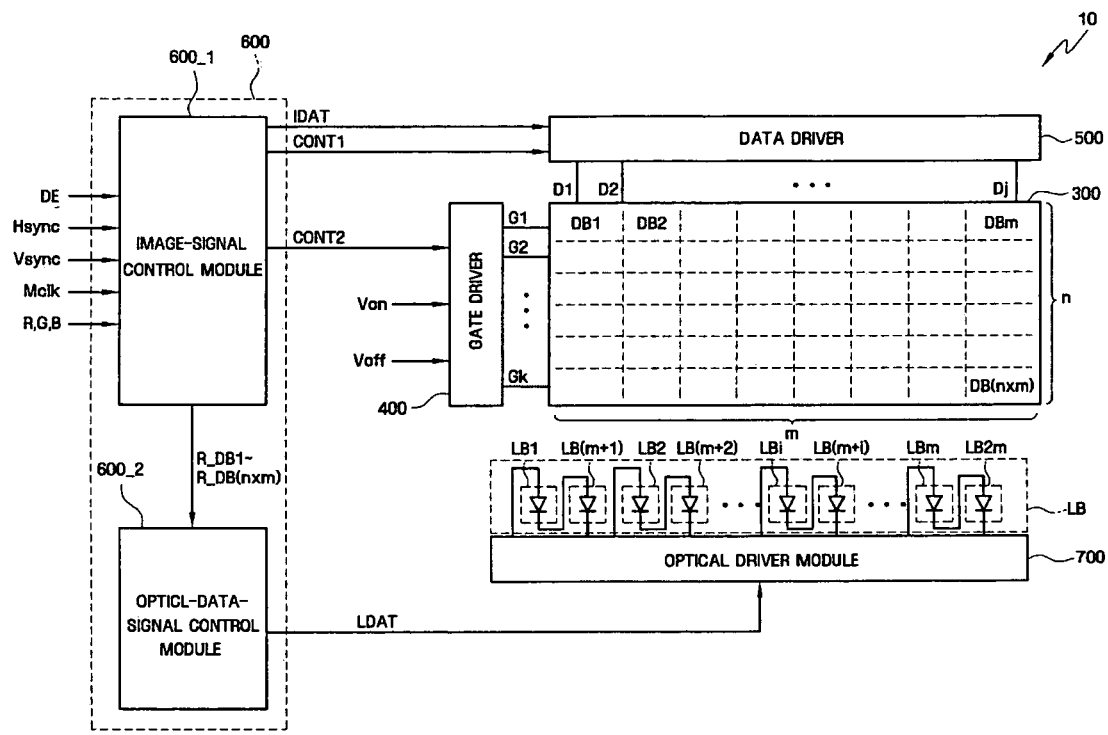
FIG. 1 illustrates a block diagram of a liquid crystal display (LCD) having a backlight assembly according to an exemplary embodiment of the present invention.
Figure 7:
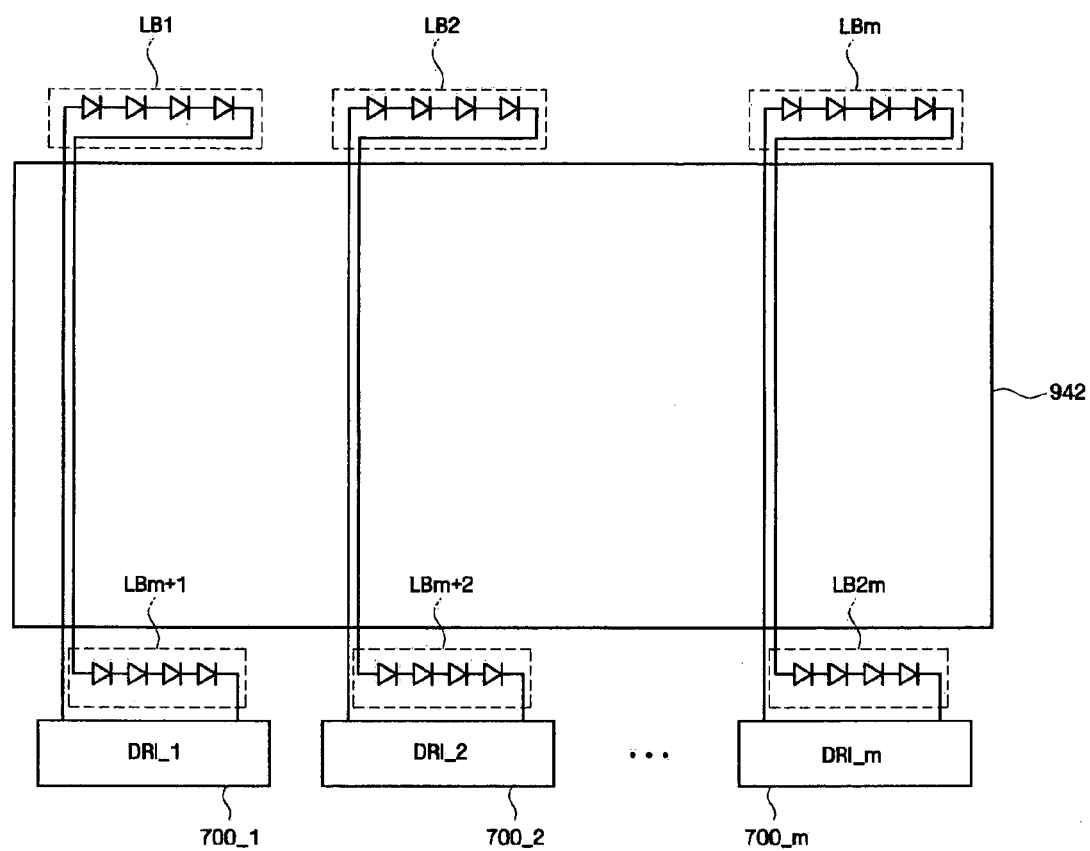
FIG. 7 illustrates a circuit diagram showing a connection of light-emitting blocks according to an exemplary embodiment of the present invention.

Referring to FIGS. 1 and 7, an LCD 10 may include a liquid crystal panel 300, a gate driver 400, a data driver 500, a timing controller 600 and an optical driver module 700. The timing controller 600 may include the image-signal control module 600_1 and an optical-data-signal control module 600_2. The image-signal control module 600_1 may control an image displayed on the liquid crystal panel 300, and the optical-data-signal control module 600_2 may control the optical driver module 700. In an exemplary embodiment, the image-signal control module 600_1 and the optical-data-signal control module 600_2 may be physically separate from each other. The optical driver module 700 may include a plurality of optical drivers 700_1 through 700_m.

Figure 2:
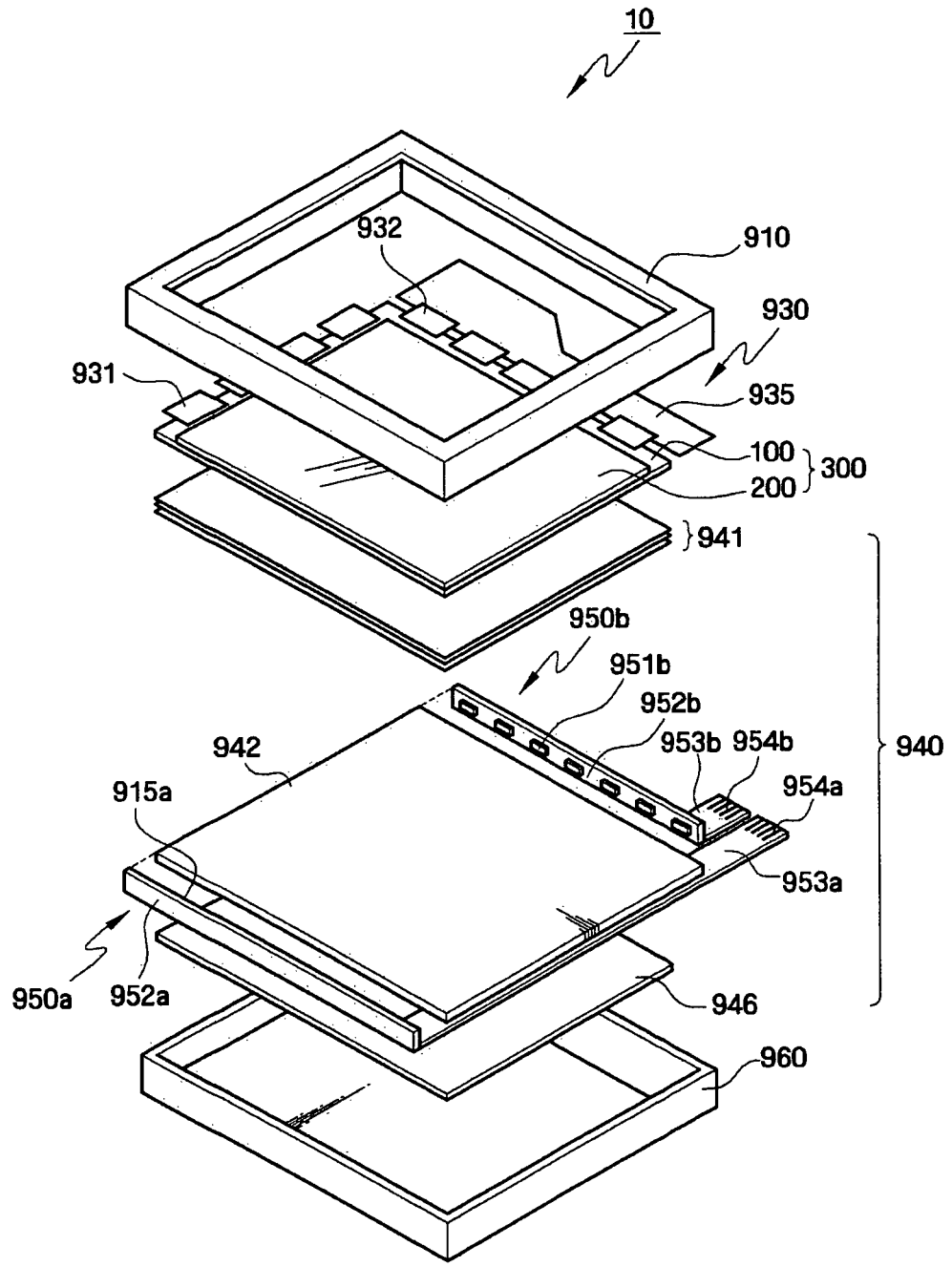
FIG. 2 illustrates an exploded perspective view of an LCD according to an exemplary embodiment of the present invention.
Figure 3:
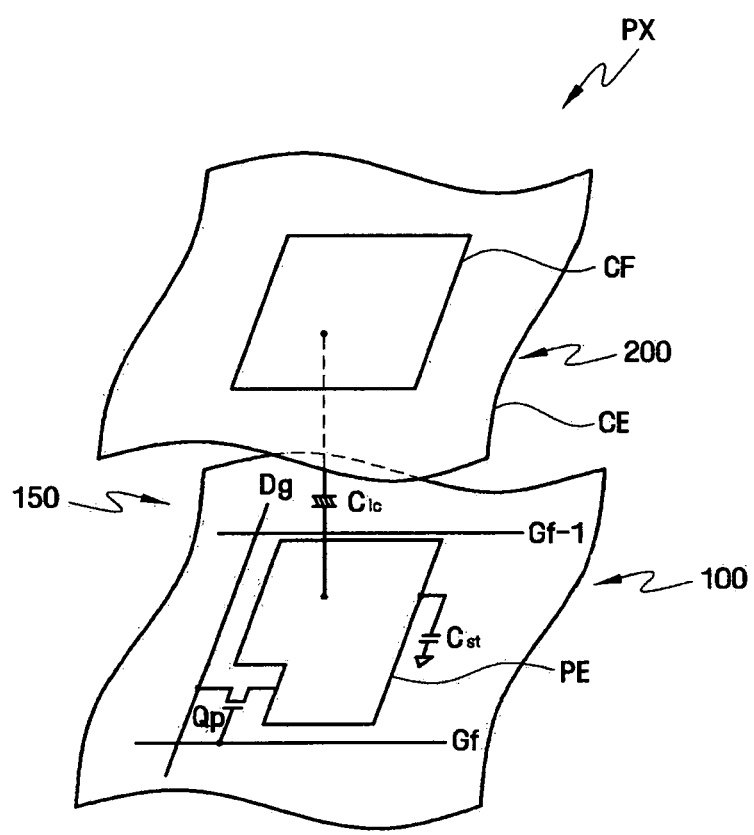
FIG. 3 illustrates a circuit diagram of a pixel of an LCD according to an exemplary embodiment of the present invention.

Referring to FIGS. 2 and 3, the LCD 10 may include a liquid crystal panel assembly 930, a backlight assembly 940, an upper container 910 and a lower container 960.

The liquid crystal panel assembly 930 may include the liquid crystal panel 300, a plurality of gate tape carrier packages (TCPs) 931, a plurality of data TCPs 932 and an integrated printed circuit board (PCB) 935. The liquid crystal panel 300 may include a first display panel 100, a second display panel 200 and a liquid crystal layer 150 interposed between the first and second display panels 100 and 200.

Referring to FIGS. 1 and 3, the liquid crystal panel 300 may include display blocks DB1 through DB(n×m), which are arranged in, for example, an (n×m) matrix. Each of the display blocks DB1 through DB(n×m) may include a plurality of pixels. The liquid crystal panel 300 may include a plurality of gate lines G1 through Gk and a plurality of data lines D1 through Dj.

Referring to FIG. 3, a pixel PX, which is connected to an f-th gate line Gf (1≤f≤k) and a g-th data line Dg (1≤g≤j), may include a liquid crystal capacitor $C_{lc}$ and a storage capacitor $C_{st}$. The liquid crystal capacitor $C_{lc}$ may include a pixel electrode PE formed on the first display panel 100, a common electrode CE formed on the second display panel 200 and the liquid crystal layer 150 interposed between the pixel electrode PE and the common electrode CE. A color filter CF may be formed on a part of the second display panel 200. The pixel may also include a switching element Qp connected to an f-th gate line Gi (1≤f≤c) and connected to a g-th data line Dg (1≤g≤j). The switching element Qp may provide a data voltage to the liquid crystal capacitor $C_{lc}$. The storage capacitor $C_{st}$ may be omitted according to an exemplary embodiment of the present invention.

Referring to FIGS. 1 and 2, the gate TCPs 931 may be connected to the gate lines G1 through Ck formed on the first display panel 100, and the data TCPs 932 may be connected to the data lines D1 through Dj formed on the first display panel 100.

Various driving elements for processing a gate control signal CONT2 and a data control signal CONT1 may be mounted on the integrated PCB 935. That is, the integrated PCB 935 may be connected to the liquid crystal panel 300 and may thus provide image information. The gate control signal CONT2 may be input to the gate TCPs 931, and the data control signal CONT1 may be input to the data TCPs 932.

The backlight assembly 940 may include a plurality of optical sheets 941, a waveguide plate 942, first and second light-emitting modules 950a and 950b and a reflective sheet 946.

The waveguide plate 942 may guide light emitted by the first and second light-emitting modules 950a and 950b to the liquid crystal panel 300. The waveguide plate 942 may comprise a transparent plastic material and may transmit light. For example, the waveguide plate 942 may comprise an acrylic resin such as polymethyl methacrylate (PMMA) or polycarbonate. When light incident upon one surface of the waveguide plate 942 penetrates into the waveguide plate 942 and thus arrives at the top or bottom surface of the waveguide plate 942, the light is reflected for example, entirely, from the top or bottom surface of the waveguide plate 942 and is uniformly distributed throughout the whole waveguide plate 942, instead of being emitted from the waveguide plate 942.

A plurality of diffusion patterns may be formed on at least one of the top or bottom surface of the waveguide plate 942 and may guide light transmitted through the waveguide plate 942 to the liquid crystal panel 300, which is disposed above the waveguide plate 942. For example, the diffusion patterns may be formed on the bottom surface of the waveguide plate 942. That is, light transmitted through the waveguide plate 942 may be reflected by the diffusion patterns and may be emitted from the waveguide plate 942 through the top surface of the waveguide plate 942.

The first and second light-emitting modules 950a and 950b may be disposed on opposite sides of the waveguide plate 942. In an exemplary embodiment, the waveguide plate 942 may be formed as a flat plate having a substantially uniform thickness to uniformly distribute light over an entire display screen. The waveguide plate 942 may be formed in various shapes according to exemplary embodiments of the present invention.

The first light-emitting module 950a may be disposed on one side of the waveguide plate 942, and the second light-emitting module 950b may be disposed on the other side of the waveguide plate 942. Each of the first and second light-emitting modules 950a and 950b may include a plurality of light-emitting blocks providing light. At least one of the light-emitting blocks included in the first light-emitting module 950a and at least one of the light-emitting blocks included in the second light-emitting module 950b may be electrically connected to each other.

The reflective sheet 946 may be disposed behind the waveguide plate 942 and may reflect light emitted from the bottom of the waveguide plate 942 back toward the waveguide plate 942. For example, the reflective sheet 946 may reflect light not reflected by the diffusion patterns on the waveguide plate 942 toward the waveguide plate 942, thereby reducing light loss and improving the uniformity of light penetrated into the waveguide plate 942.

The optical sheets 941 may be disposed above the waveguide plate 942. The optical sheets 941 may diffuse and collect light transmitted by the waveguide plate 942. The optical sheets 141 may include a diffusion sheet, a plurality of prism sheets and a protective sheet. The diffusion sheet may be disposed between the waveguide plate 942 and the prism sheet and may diffuse light incident thereupon from the waveguide plate 942, thereby preventing the light from being concentrated in certain areas. A plurality of triangular prisms may be formed on the top surface of each of the prism sheets. For example, the optical sheets 941 may include two prism sheets. In an exemplary embodiment, a plurality of prisms formed on one of the prism sheets may form a predetermined angle with a plurality of prisms formed on the other prism sheet. Thus, the prism sheets may collect light diffused by the diffusion sheet and may thus enable the collected light to be substantially perpendicularly incident upon the liquid crystal panel 300. Therefore, light transmitted through the prism sheets may travel perpendicularly toward the liquid crystal panel 300. Thus, the distribution of luminance on the protective sheet may become regular. The protective sheet may be disposed on the prism sheets, and may protect the prism sheets. The protective sheet may diffuse light and may thus provide a uniform distribution of light. The structure of the optical sheets 941 may be altered according to exemplary embodiments of the present invention.

The liquid crystal panel 300 may be disposed on the protective sheet, and may be contained in the lower container 960 together with the backlight assembly 940. The lower container 960 may have four sidewalls formed along the edges of the bottom of the lower container 960. Thus, the lower container 960 may contain and fix the backlight assembly 940 and the liquid crystal panel assembly 930 therein. The lower container 960 may prevent the backlight assembly 940, including a plurality of sheets, from being bent. The integrated PCB 935 of the liquid crystal panel assembly 930 may be bent along a side surface of the lower container 960 and may be disposed on the rear surface of the lower container 960. The shape of the lower container 960 may be altered in various manners according to exemplary embodiments of the present invention.

The upper container 910 may be coupled to the lower container 960 to cover the top surface of the liquid crystal panel assembly 930 contained in the lower container 960. A window may be formed on the top of the upper container 910. Thus, the liquid crystal panel assembly 930 may be exposed through the window of the upper container 910.

The image-signal control module 600_1 may receive an image signal (red (R), green (G), and blue (B)) and a plurality of external control signals (Vsync, Hsync, Mclk, and DE) for controlling the display of the image signal (R, G, and B) from an external graphic controller. Thereafter, the image-signal control module 600_1 may generate the data control signal CONT1 and the gate control signal CONT2 based on the image signal (R, G and B) and the external control signals (Vsync, Hsync, Mclk, and DE). The external control signals include a vertical synchronization signal Vsync, a horizontal synchronization signal Hsync, a main clock signal Mclk, and a data enable signal DE. The image-signal control module 600_1 may generate a plurality of representative image signals R_DB1 through R_DB(n×m) respectively corresponding to the display blocks DB1 through DB(n×m) based on the image signal (R, G and B). The image-signal control module 600_1 may provide the representative image signals R_DB1 through R_DB(n×m) to the optical-data-signal control module 600_2.

Figure 5:
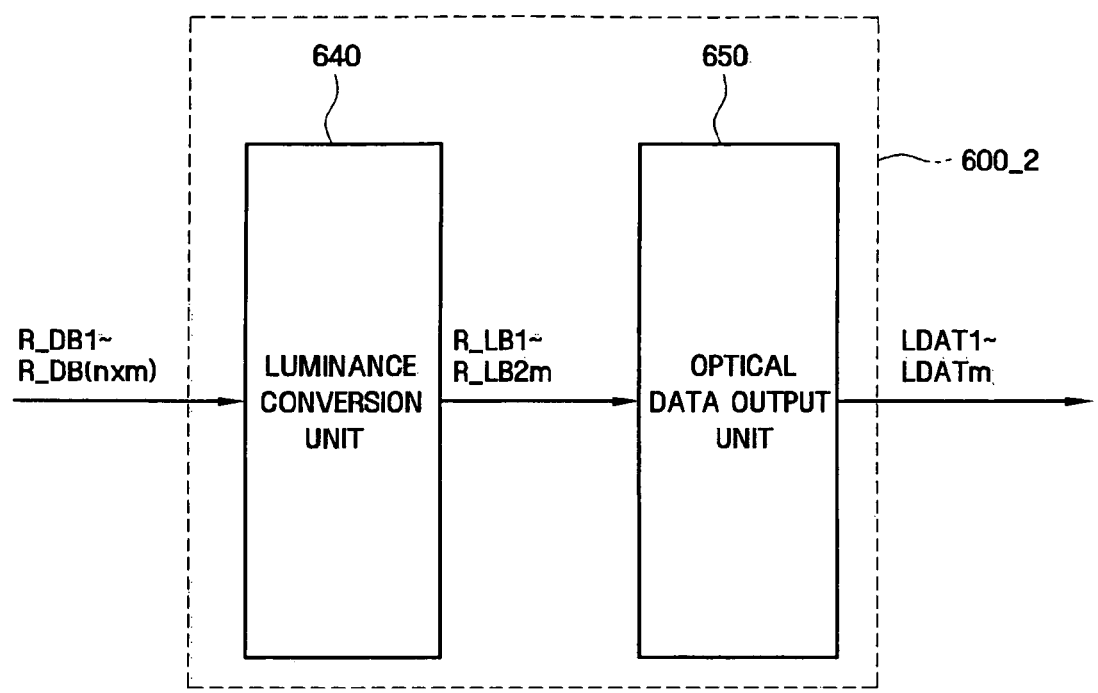
FIG. 5 illustrates a block diagram of an optical-data-signal control module according to an exemplary embodiment of the present invention.

Referring to FIGS. 1 and 5, the optical-data-signal control module 600_2 may receive the representative image signals R_DB1 through R_DB(n×m), and may provide an optical data signal LDAT corresponding to the representative image signals R_DB1 through R_DB(n×m) to the optical driver module 700. The optical data signal LDAT may include a plurality of optical data signals LDAT1 through LDATm. In an exemplary embodiment, the optical-data-signal control module 600_2 may provide the optical data signals LDAT1 through LDATm to the optical drivers 700_1 through 700_*m*, respectively.

Figure 4:
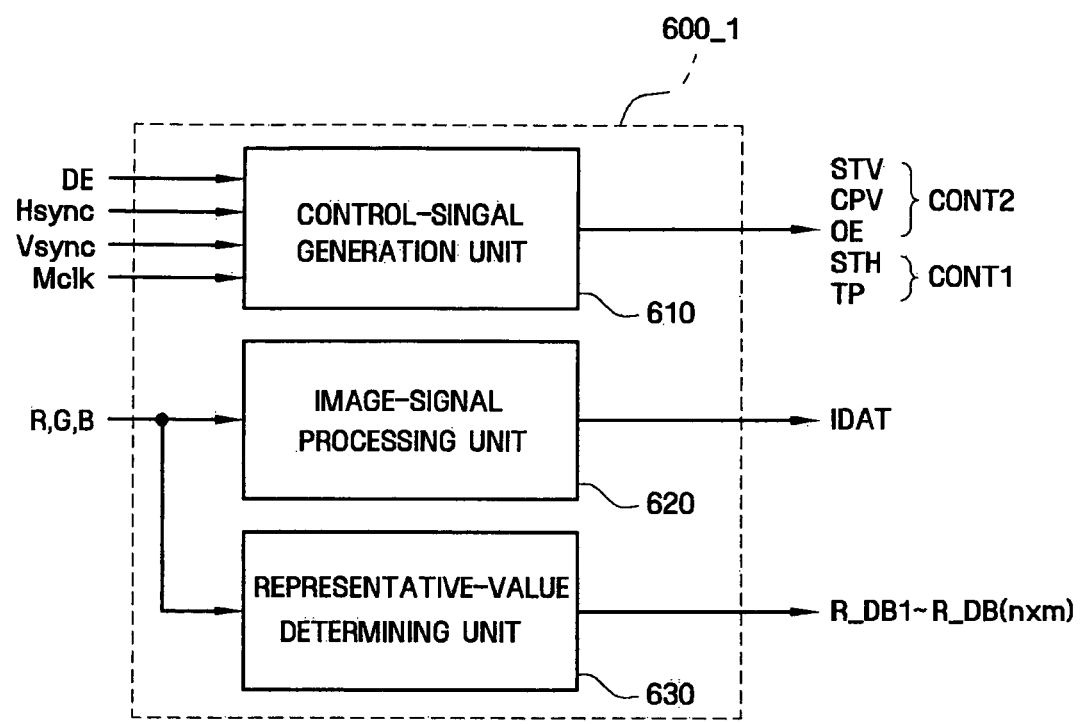
FIG. 4 illustrates a block diagram of an image-signal control module according to an exemplary embodiment of the present invention.

Referring to FIGS. 1 and 4, the image-signal control module 600_1 may include a control-signal generation unit 610, an image-signal processing unit 620 and a representative-value determining unit 630.

The control-signal generation unit 610 may receive the external control signals (Vsync, Hsync, Mclk, and DE) and may output the data control signal CONT1 and the gate control signal CONT2. For example, the control-signal generation unit 610 may output a vertical initiation signal STV for initiating the operation of the gate driver 400, a gate clock signal CPV for determining when to output a gate-on voltage Von, an output enable signal OE for determining the pulse width of the gate-on voltage Von, a horizontal initiation signal STH for initiating the operation of the data driver 500, and an output instruction signal TP for providing instructions to output an image data voltage.

The image-signal processing unit 620 may receive the image signal (R, G and B) and may output an image data signal IDAT.

The representative-value determining unit 630 may determine the representative image signals R_DB1 through RD_B (n×m) respectively corresponding to the display blocks DB1 through DB(n×m). For example, the representative-value determining unit 630 may receive the image signal (R, G and B) and may determine the representative image signals R_DB1 through R_DB(n×m) based on the image signal (R, G and B). Each of the representative image signals R_DB1 through R_DB(n×m) may be an average image signal (R, G and B) provided to a corresponding display block. Therefore, each of the representative image signals RD_DB1 through R_DB(n×m) may indicate the average luminance of the corresponding display block. Alternatively, each of the representative image signals R_DB1 through R_DB(n×m) may indicate the gray level of the corresponding display block. The representative-value determining unit 630 may determine the representative image signals R_DB1 through R_DB(n×m) using the image data signal IDAT, instead of using the image signal (R, G and B).

Referring to FIG. 5, the optical data signal control module 600_2 may include a luminance conversion unit 640 and an optical-data output unit 650.

The luminance conversion unit 640 may receive the representative image signals R_DB1 through R_DB(n×m) and may determine luminance levels R_LB1 through R_LB2*m* of the light-emitting blocks LB1 through LB2*m* respectively corresponding to the representative image signals R_DB1 through R_DB(n×m). The luminance conversion unit 640 may output the luminance levels R_LB1 through R_LB2*m* to the optical-data output unit 650. The luminance conversion unit 640 may determine the luminance levels R_LB1 through R_LB(n×m) with reference to a lookup table. A number of light-emitting blocks included in the same light-emitting group may be determined to have the same luminance level.

The optical-data output unit 650 may output the optical data signals LDATV1 through LDATVm, which are to be applied to the light-emitting blocks LB1 through LB2*m*. The optical data signals LDATV1 through LDATVm may be signals determined according to the image displayed by the display blocks DB1~DB(n×m), which are provided with light by the light-emitting blocks LB1 through LB2*m*.

Referring to FIGS. 1 and 2, the data driver 500 may be provided with the data control signal CONT1 by the image-signal control module 600_1 and may apply an image data voltage to the data lines D1 through Dj. The data control signal CONT1 may include a plurality of signals for controlling the image signal (R, G and B) and the operation of the data driver 500 such as a horizontal initiation signal for initiating the operation of the data driver 500 and an output instruction signal for providing instructions to output an image data voltage.

The gate driver 400 may be provided with the gate control signal CONT2 by the image-signal control module 600_1 and may apply a gate signal to the gate lines G1 through Gk. The gate signal may include the gate-on voltage Von and a gate-off voltage Voff, which are provided by a gate on/off voltage generator. The gate control signal CONT2, which is a signal for controlling the operation of the gate driver 400, may include a vertical initiation signal for initiating the operation of the gate driver 400, a gate clock signal for determining when to output the gate-on voltage Von, and an output enable signal for determining the pulse width of the gate-on voltage Von.

The gate driver 400 or the data driver 500 may be directly mounted on the liquid crystal panel 300 as an integrated circuit chip, or may be attached onto the liquid crystal panel 300 as a TCP by being mounted on a flexible printed circuit film (FPC). Alternatively, the gate driver 400 or the data driver 500 may be mounted on the liquid crystal panel 300 together with the gate lines G1 through Gk, the data lines D1 through Dj and the switching element Qp of each pixel.

Figure 6:
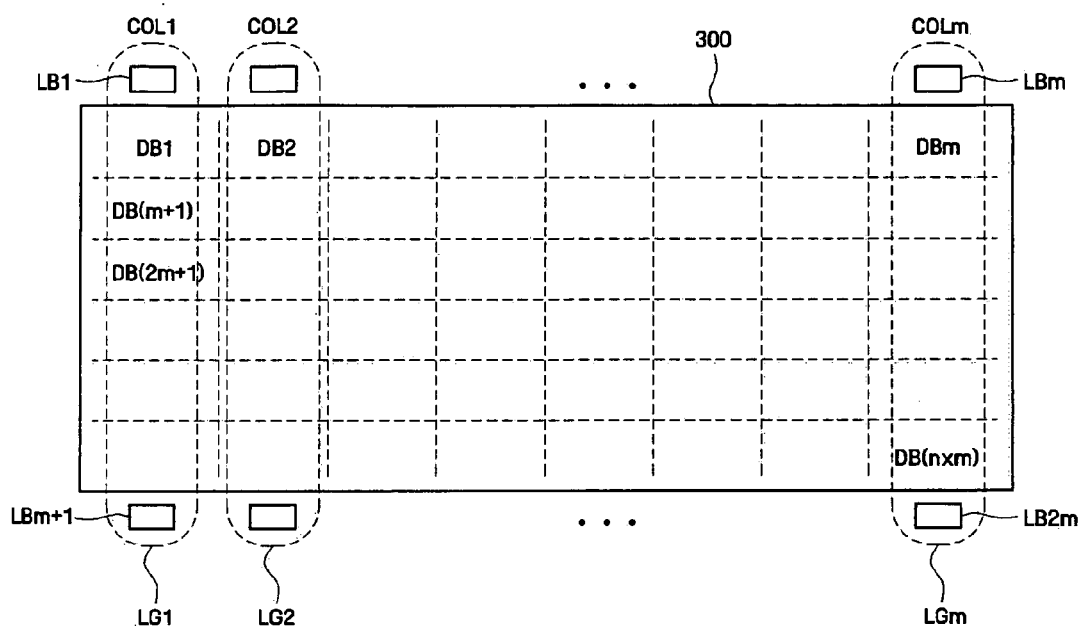
FIG. 6 illustrates a diagram showing an arrangement of a plurality of display blocks, a plurality of light-emitting blocks and a plurality of light-emitting groups according to an exemplary embodiment of the present invention.

Referring to FIG. 6, the light-emitting blocks LB1 through LB2$m$ may be point light sources arranged in an edge-type manner according to an exemplary embodiment of the present invention. For example, the light-emitting blocks LB1 through LB2$m$ may be light-emitting diodes (LEDs). The light-emitting blocks LB1 through LB2$m$ may include the first light-emitting blocks LB1 through LBm and the second light-emitting blocks LB(m+1) through LB2$m$. When the display blocks DB1~DB(n×m) are arranged in a matrix having n rows and m columns, the first light-emitting blocks LB1 through LBm may respectively correspond to m display block columns COL1 through COLm, and the second light-emitting blocks LB(m+1) through LB2$m$ may respectively correspond to the m display block columns COL1 through COLm. The light-emitting blocks LB1 through LB2$m$ may provide light to the display block columns COL1 through COLm.

For example, the first light-emitting module 950$a$ includes the first light-emitting blocks LB1 through LBm and the second light-emitting module 950$b$ includes the second light-emitting blocks LB(m+1) through LB2$m$. The first light-emitting module 950$a$ may be disposed on one side of the display blocks DB1 through DB(n×m) and may provide light to the display blocks DB1 through DB(n×m) from, for example, above the display blocks DB1 through DB(n×m). The second light-emitting module 950$b$ may be disposed on the other side of the display blocks DB1 through DB(n×m) and may provide light to the display blocks DB1 through DB(n×m) from, for example, below the display blocks DB1 through DB(n×m). At least one of the first light-emitting blocks LB1 through LBm and at least one of the second light-emitting blocks LB(m+1) through LB2$m$ may be electrically connected and may be included in the same light-emitting group. In this manner, the light-emitting groups LG1 through LGm may be defined.

In an exemplary embodiment, the first light-emitting blocks LB1 through LBm and the second light-emitting blocks LB(m+1) through LB2$m$ are disposed on opposite sides of the liquid crystal panel 300. In an exemplary embodiment, the first light-emitting blocks LB1 through LBm and the second light-emitting blocks LB(m+1) through LB2$m$ may be disposed on opposite sides of the waveguide plate 942, which is disposed behind the liquid crystal panel 300.

Referring to FIG. 7, the first light-emitting blocks LB1 through LBm and the second light-emitting blocks LB(m+1) through LB2$m$ are electrically connected to each other. In an exemplary embodiment, the first and second light-emitting blocks LB1 and LB(m+1) are connected to the first optical driver 700_1. In an exemplary embodiment, the other first and second light-emitting blocks LB2 through LBm and LB(m+2) through LBm are connected to the second through m-th optical drivers 700_2 through 700_$m$.

Referring to FIG. 7, the first optical driver 700_1 may be provided with optical data LDAT. Thereafter, the first optical driver 700_1 may control the luminance levels of the first and second light-emitting blocks LB1 and LB(m+1) by providing a voltage corresponding to the optical data LDAT to the first and second light-emitting blocks LB1 and LB(m+1). Each of the first and second light-emitting blocks LB1 and LB(m+1) may include a plurality of light-emitting devices. A plurality of light-emitting devices included in each of the light-emitting groups LG1 through LGm may be connected, for example, in series, as shown in FIG. 6. For example, each of the first and second light-emitting blocks LB1 and LB(m+1) may include four light-emitting devices. In an exemplary embodiment eight light-emitting devices may be connected in series. The number of light-emitting devices included in each of the first and second light-emitting blocks LB1 and LB(m+1) may vary according to exemplary embodiments of the present invention. The light-emitting devices of each of the first and second light-emitting blocks LB1 and LB(m+1) may be LEDs according to an exemplary embodiment of the present invention.

The first and second light-emitting blocks LB1 and LB(m+1) may be connected to the first optical driver 700_1, for example, as a string. For example, a first end of the first light-emitting block LB1 may be connected to the first optical driver 700_1, and a second end of the first light-emitting block LB1 may be connected to a first end of the second light-emitting block LB(m+1). A second end of the second light-emitting block LB(m+1) may be connected to the first optical driver 700_1. Therefore, the luminance levels of the first and second light-emitting blocks LB1 and LB(m+1) may be controlled at the same time. That is, the first and second light-emitting blocks LB1 and LB(m+1) may be connected to the first optical driver 700_1, for example, as a string and may be turned on or off at the same time. Alternatively, the first and second light-emitting blocks LB1 and LB(m+1) may be connected in series across the first optical driver 700_1.

Referring to FIGS. 2 and 7, the LCD 10 may include the waveguide plate 942, which guides light, the first light-emitting module 950$a$, which is disposed on one side of the waveguide plate 942 and includes the first light-emitting blocks LB1 through LBm providing light, and the second light-emitting module 950$b$, which is disposed on the other side of the waveguide plate 942 and includes the second light-emitting blocks LB(m+1) through LB2$m$ providing light. At least one of the first light-emitting blocks LB1 through LBm and at least one of the second light-emitting blocks LB(m+1) through LB2$m$ may be electrically connected. The waveguide plate 942 may be disposed behind the liquid crystal panel 300.

Each of the light-emitting blocks LB1 through LB2$m$ may include a plurality of light-emitting devices 951$a$ and 951$b$. The light-emitting devices 951$a$ may be disposed in the first light-emitting module 950a, and the light-emitting devices 951b may be disposed in the second light-emitting module 950b. The first light-emitting module 950a may include a first supporting unit 952a on which the light-emitting devices 951a are disposed and a first wiring unit 953a which includes the wires of the light-emitting devices 951a. The second light-emitting module 950b may include a second supporting unit 952b on which the light-emitting devices 951b are disposed and a second wiring unit 953b which includes the wires of the light-emitting devices 951b. The first and second light-emitting modules 950a and 950b may be PCBs or FPCs according to an exemplary embodiment of the present invention.

The first and second supporting units 952a and 952b may face each other. That is, the light-emitting devices 951a disposed on the first supporting unit 952a may face the light-emitting devices 951b disposed on the second supporting unit 952b. Thus, the light-emitting devices 951a and the light-emitting devices 951b may provide light to the waveguide plate 942.

The first and second supporting units 952a and 952b may be double-sided PCBs, for example, FR4 PCBs. In an exemplary embodiment, the wires of the light-emitting devices 951a may be formed in the first supporting unit 952a, and the wires of the light-emitting devices 951b may be formed in the second supporting unit 952b. For example, referring to FIG. 1, wires for electrically connecting the light-emitting blocks LB1 through LB2m or wires for electrically connecting the light-emitting devices 951a and the light-emitting devices 951b may be included in the first and second wiring units 953a and 953b.

The first and second wiring units 953a and 953b may include first and second connection terminals 954a and 954b, respectively. The first and second connection terminals 954a and 954b may be electrically connected to the light-emitting blocks LB1 through LB2m. The first and second connection terminals 954a and 954b may be electrically connected by a connection unit. For example, the first and second connection terminals 954a and 954b may electrically connect at least one of the first light-emitting blocks of the first light-emitting module 950a and at least one of the second light-emitting blocks of the second light-emitting module 950b. First ends of the first and second connection terminals 954a and 954b may be connected to the optical driver module 700. Thus, a voltage provided by the optical driver module 700 may be applied to the light-emitting devices included in each of the first light-emitting blocks LB1 through LBm through the light-emitting devices included in each of the second light-emitting blocks LB(m+1) through LB2m.

The first and second supporting units 952a and 952b may extend in a first direction along one side of the waveguide plate 942. The first and second wiring units 953a and 953b may extend in a second direction, which is different from the first direction, along another side of the waveguide plate 942. For example, the first and second supporting units 952a and 952b may extend in a latitudinal direction of the waveguide plate 942, and the first and second wiring units 953a and 953b may extend in a longitudinal direction of the waveguide plate 942. Alternatively, the first and second supporting units 952a and 952b may extend in the longitudinal direction of the waveguide plate 942, and the first and second wiring units 953a and 953b may extend in the latitudinal direction of the waveguide plate 942.

The first wiring unit 953a may be disposed behind the waveguide plate 942. For example, the first wiring unit 953a may guide the wires of a plurality of light-emitting devices disposed in the first light-emitting module 950a to the optical driver module 700. The first wiring unit 953a may be disposed behind the waveguide plate 942 and may extend along one side of the waveguide plate 942. Thus, a size of the LCD 10 does not increase due to the first wiring unit 953a. The first wiring unit 953a can be disposed directly behind the waveguide plate 942 in an exemplary embodiment. In an exemplary embodiment, the first wiring unit 953a may be disposed indirectly behind the waveguide plate 942. For example, the first wiring unit 953a may be disposed under the reflective sheet 946.

The first wiring unit 953a may be perpendicularly coupled to the first supporting unit 952a. When the first supporting unit 952a is an FR4 PCB, the wires of a plurality of light-emitting devices may be formed in the first supporting unit 952a in an exemplary embodiment. Thus, when the first wiring unit 953a is perpendicularly coupled to the first supporting unit 952a, the first wiring unit 953a may be electrically connected to the wires formed in the first supporting unit 952a.

Figure 8:
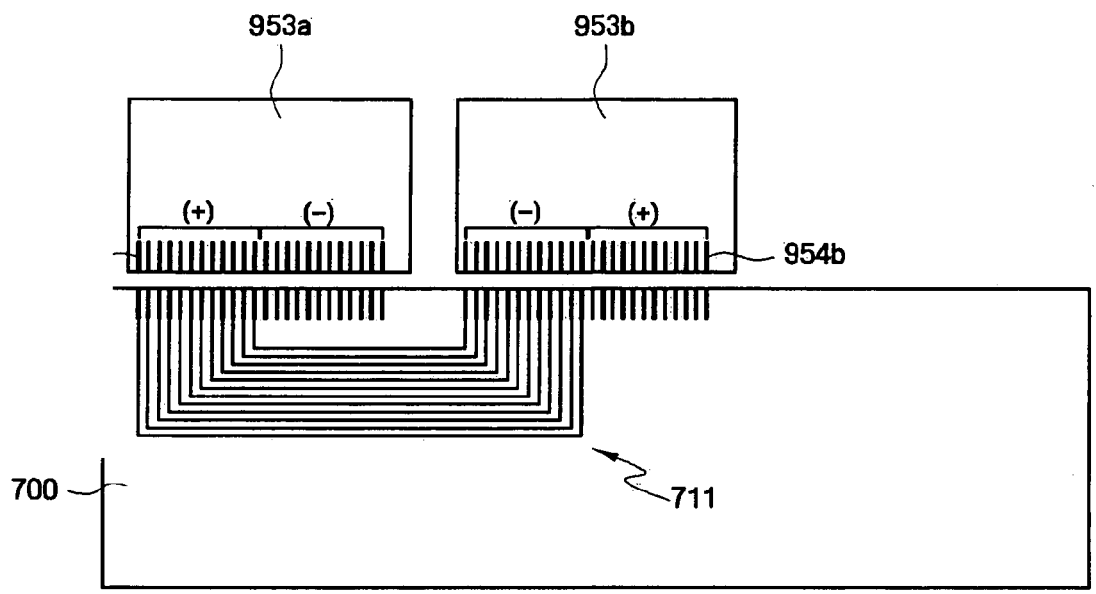
FIG. 8 illustrates a diagram showing a connection of first and second wiring units and an optical driver module according to an exemplary embodiment of the present invention.

Referring to FIGS. 2 and 8, the first and second wiring units 953a and 953b may include the first and second connection terminals 954a and 954b, respectively. First ends of the first and second wiring units 953a and 953b may be connected to the first and second supporting units 952a and 952b, and the first and second connection terminals 954a and 954b may be formed at second ends of the first and second wiring units 953a and 953b. Each of the first and second connection terminals 954a and 954b may include an anode terminal (+) and a cathode terminal (−). The anode terminal (+) and/or the cathode terminal (−) of the first connection terminal 954a may be electrically connected to the cathode terminal (−) and/or the anode terminal (+), respectively, of the second connection terminal 954b.

For example, the anode terminal (+) of the first connection terminal 954a may be connected to the cathode terminal (−) of the second connection terminal 954b. Alternatively, the cathode terminal (−) of the first connection terminal 954a may be connected to the anode terminal (+) of the second connection terminal 954b. The first and second connection terminals 954a and 954b may be electrically connected by a connection unit 711 on the optical driver module 700. The connection unit 711 may be a place where the light-emitting devices included in the first light-emitting module 950a and the light-emitting devices included in the second light-emitting module 950b are connected in series. Thus, a voltage applied by the optical driver module 700 may correspond to the difference between the voltage at the end of the cathode terminal (−) of the first connection terminal 954a and the voltage at the end of the anode terminal (+) of the second connection terminal 954b. A connector may be used as the connection unit 711.

Due to the connection unit 711 of the optical driver module 700, either the light-emitting devices of the first light-emitting block LB1, the light-emitting devices of the second light-emitting block LB(m+1), the anode terminal (+) of the first connection terminal 954a and the cathode terminal (−) of the second connection terminal 954b, or the light-emitting devices of the first light-emitting block LB1, the light-emitting devices of the second light-emitting block LB(m+1), the cathode terminal (−) of the first connection terminal 954a and the anode terminal (+) of the second connection terminal 954b may be connected in series. Thus, the optical driver module 700 may adjust the luminance levels of the first and second light-emitting blocks LB1 and LB(m+1) by applying a voltage to the first and second light-emitting blocks LB1 and LB(m+1) through the first and second connection terminals 954a and 954b. In an exemplary embodiment, the anode terminal (+) of the first connection terminal 954a is connected to the cathode terminal (−) of the second connection terminal 954b. In an exemplary embodiment, the cathode terminal (−) of the first connection terminal 954a is connected to the anode terminal (+) of the second connection terminal 954b.

Figure 9:
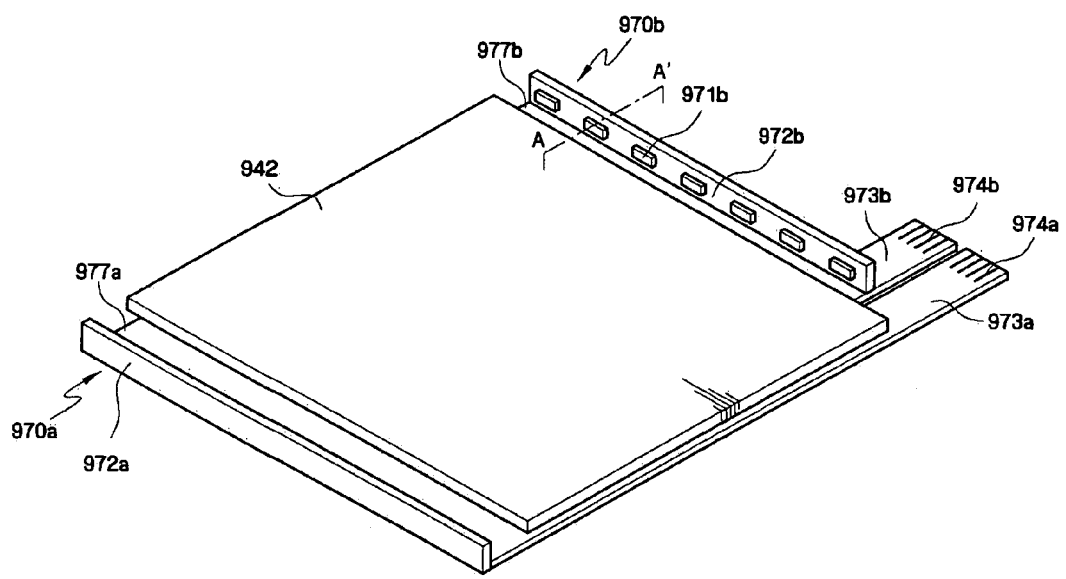
FIG. 9 illustrates a perspective view of a backlight assembly according to an exemplary embodiment of the present invention and an LCD having the backlight assembly.
Figure 10:
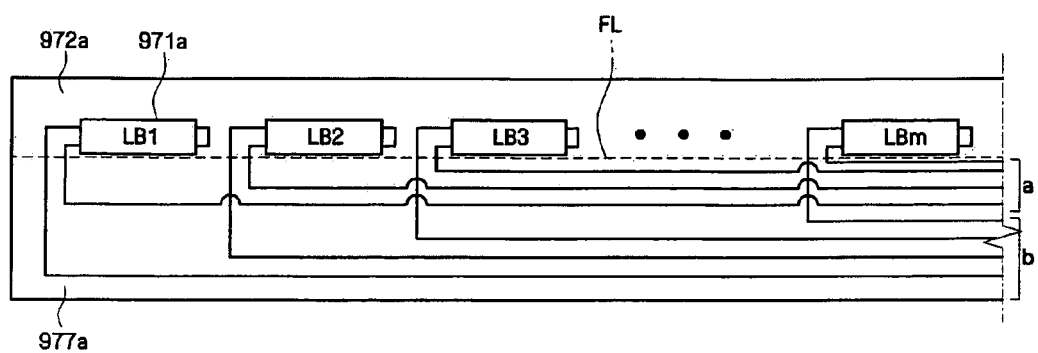
FIG. 10 illustrates a diagram showing an arrangement of a plurality of first light-emitting blocks in a first light-emitting module according to an exemplary embodiment of the present invention.
Figure 11:
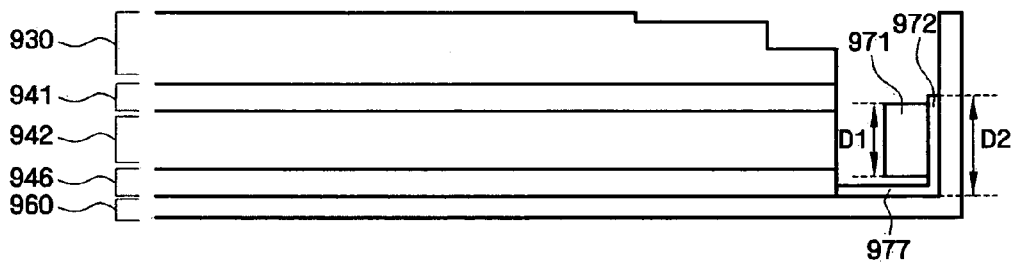
FIG. 11 illustrates a cross-sectional view taken along the line A-A' of FIG. 9 according to an exemplary embodiment of the present invention.

FIG. 9 illustrates a perspective view of a backlight assembly according to an exemplary embodiment of the present invention and an LCD having the backlight assembly. FIG. 10 illustrates a diagram showing an arrangement of a plurality of first light-emitting blocks in a first light-emitting module according to an exemplary embodiment of the present invention. FIG. 11 illustrates a cross-sectional view of the LCD 10 taken along the line A-A' of FIG. 9 according to an exemplary embodiment of the present invention.

An exemplary embodiment described in connection with FIGS. 9 through 11 is substantially similar to an exemplary embodiment described in connection with FIGS. 1 through 8 except that a first light-emitting module 970a includes a third wiring unit 977a having connection wiring for electrically connecting wires in a first wiring unit 973a, and that a second light-emitting module 970b includes a fourth wiring unit 977b having connection wiring for electrically connecting wires in a second wiring unit 973b.

Referring to FIG. 9, the first and second light-emitting modules 970a and 970b may include first and second supporting units 972a and 972b, respectively, first and second wiring units 973a and 973b, respectively, and the third and fourth wiring units 977a and 977b, respectively. A plurality of light-emitting devices may be disposed on each of the first and second supporting units 972a and 972b. The third wiring unit 977a may electrically connect the light-emitting devices on the first supporting unit 972a and the wires in the first wiring unit 973a. The fourth wiring unit 977b may electrically connect the light-emitting devices on the second supporting unit 972b and the wires in the second wiring unit 973b. For example, a plurality of light-emitting devices included in a first light-emitting block of the first light-emitting module 970a may be disposed on the first supporting unit 972a. The wires of the light-emitting devices may be connected to the first wiring unit 973a through the first supporting unit 972a and the third wiring unit 977a and may be electrically connected to a plurality of light-emitting devices 971b included in a second light-emitting block of the second light-emitting module 970b through a first connection terminal 974a.

Referring to FIG. 10, a plurality of first light-emitting blocks are arranged in the first light-emitting module 970a. The following description can be applied to the second light-emitting module 970b.

Referring to FIG. 10, each of a plurality of first light-emitting blocks LB1 through LBm in the first light-emitting module 970a may include a plurality of light-emitting devices 971a, which are mounted on the first supporting unit 972a. The wires of the light-emitting devices 971a may extend along the third wiring unit 977a. The wires of the light-emitting devices 971 may be classified into two wire groups according to whether the wires are connected to an anode terminal or a cathode terminal, and the two wire groups may be disposed in regions a and b, respectively. In exemplary embodiments, the wires of the light-emitting devices 971a may be arranged in various manners. The wires of the light-emitting devices 971a can extend along the third wiring unit 977a and can be connected to the second wiring unit 973b.

The first supporting unit 972a and the third wiring unit 977a may be demarcated from each other by a folding line FL, and may form an L-shaped structure together. That is, the first supporting unit 972a may extend perpendicularly from the third wiring unit 977a and may face a sidewall of the waveguide plate 942. In an exemplary embodiment, the third wiring unit 977a may be disposed behind the waveguide plate 942 so that the waveguide plate 942 can overlap at least a part of the third wiring unit 977a. The third wiring unit 977a may be disposed behind the waveguide plate 942. For example, the third wiring unit 977a can be disposed behind the reflective sheet 946. The above description of the connection between the first supporting unit 972a and the third wiring unit 977a can be applied to the second supporting unit 972b and the fourth wiring unit 977b.

The wires of the first light-emitting blocks LB1 through LBm may extend along the third wiring unit 977a, may be connected to the first wiring unit 973a and may be connected to the wires of a plurality of second light-emitting blocks in the second light-emitting module 970b through the first connection terminal 974a. Likewise, the wires of the second light-emitting blocks may extend along the fourth wiring unit 977b, may be connected to the second wiring unit 973b and may be connected to the wires of the first light-emitting blocks LB1 through LBm through a second connection terminal 974b.

Referring to FIGS. 2 and 11, a width D2 of a supporting unit 972 may correspond to a width D1 of a light-emitting device 971 mounted on the supporting unit 972. The light-emitting device 971 may be disposed on either side of the waveguide plate 942.

The width D1 may indicate a distance between a portion of the light-emitting device 971 closest to a lower container 960 and a portion of the light-emitting device 971 closest to the upper container 910. The width D2 may indicate a distance between a portion of the supporting unit 972 closest to the lower container 960 and a portion of the supporting unit 972 closest to the upper container 910.

Since the width D2 is slightly greater than the width D1 by the amount of margin required for mounting the light-emitting device 971, the width of a backlight assembly can be reduced. For example, when the width D1 is about 2 mm, the margin required for mounting the light-emitting device 971 may be about 0.2 mm. Thus, the width D2 may be about 2.2 mm.

Figure 12:
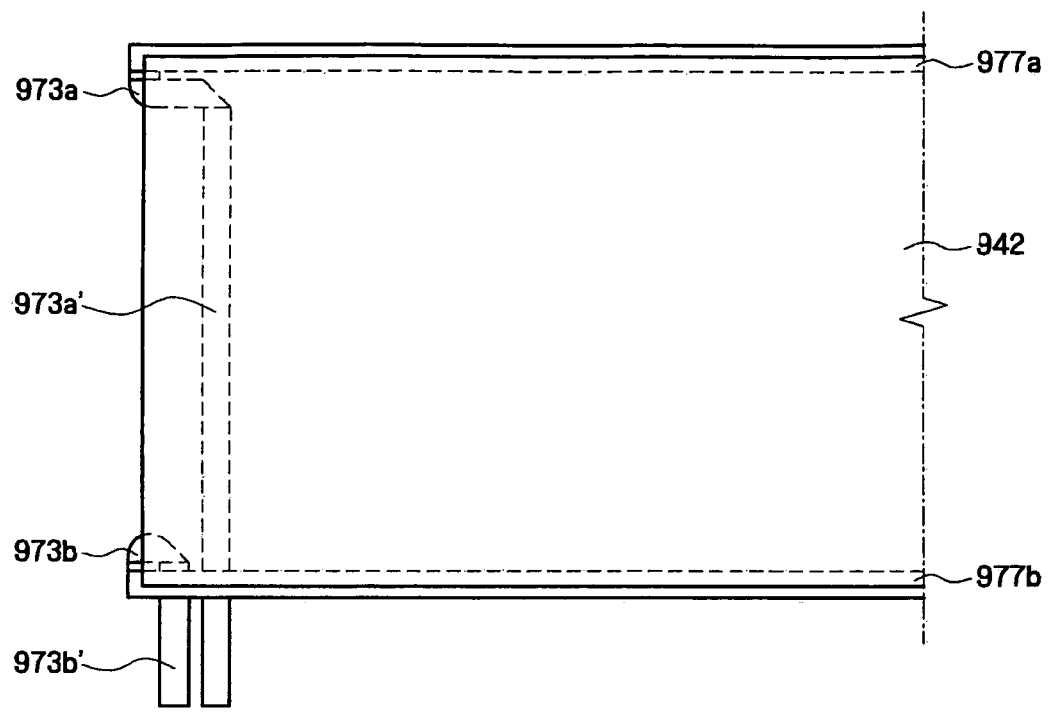
FIG. 12 illustrates a plan view of a backlight assembly according to an exemplary embodiment of the present invention and an LCD having the backlight assembly.
Figure 13A:
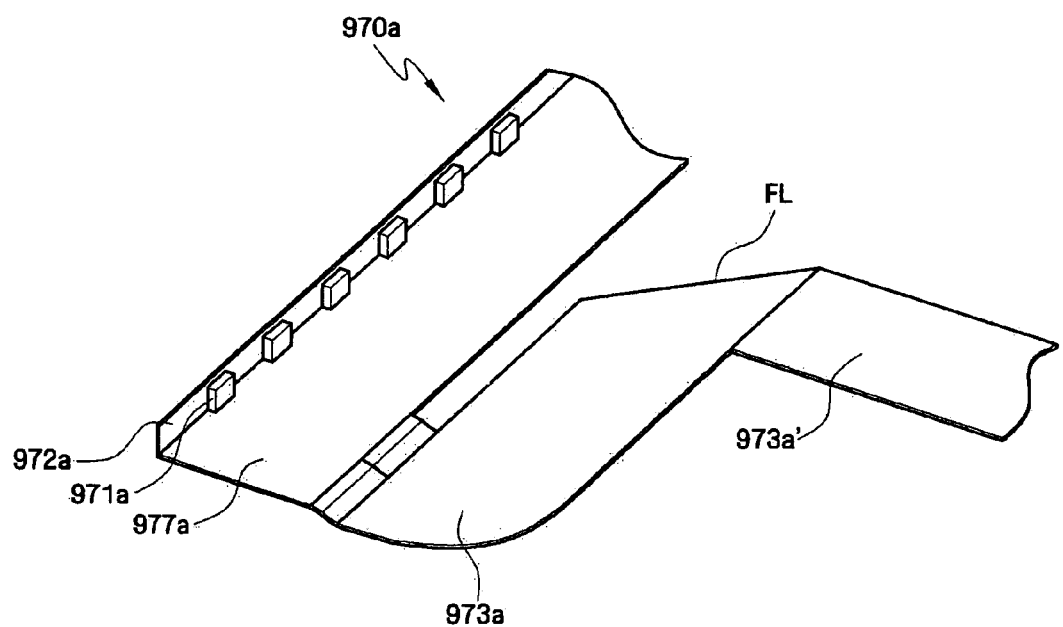
FIG. 13a illustrates a perspective view of a first light-emitting module according to an exemplary embodiment of the present invention.
Figure 13B:
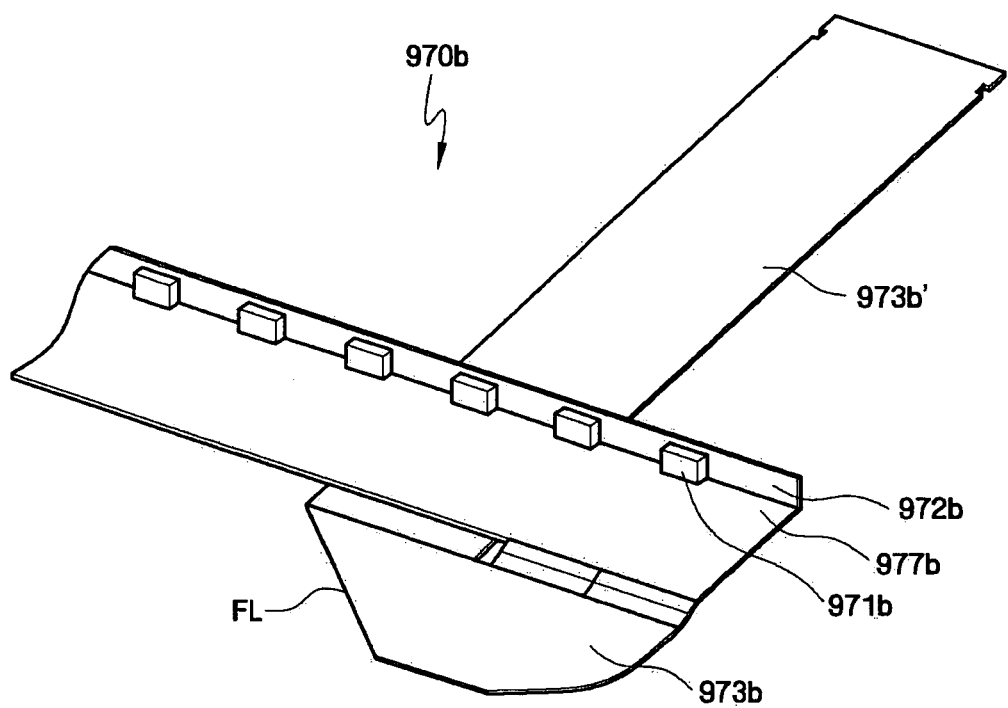
FIG. 13b illustrates a perspective view of a second light-emitting module according to an exemplary embodiment of the present invention.
Figure 14:
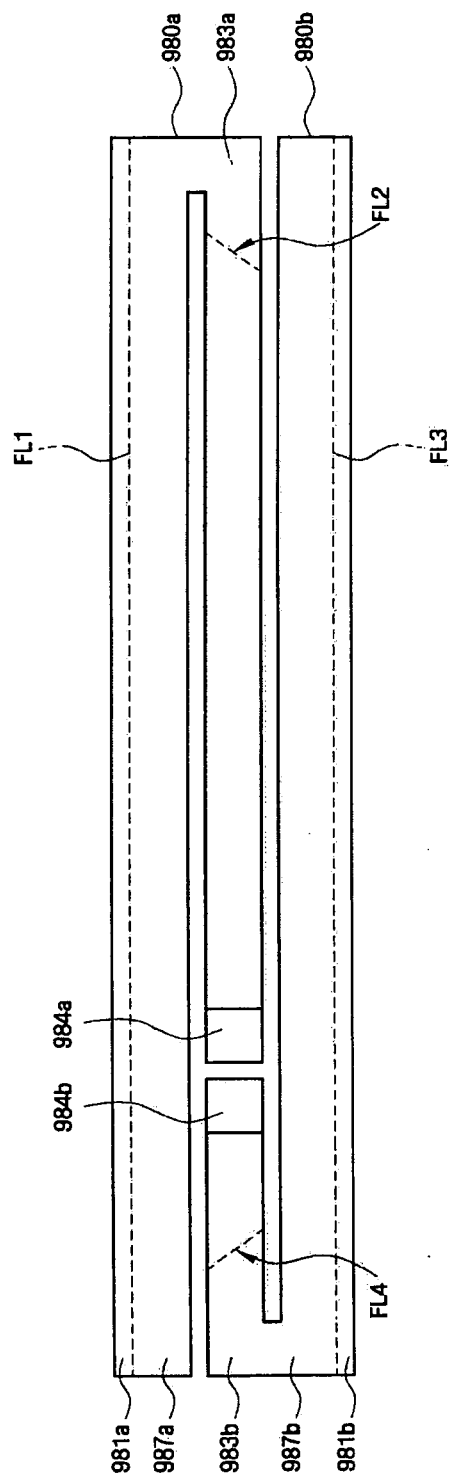
FIG. 14 illustrates first and second light-emitting modules of an LCD having a backlight assembly according to an exemplary embodiment of the present invention.

FIG. 12 illustrates a plan view of a backlight assembly according to an exemplary embodiment of the present invention. FIG. 13A illustrates a perspective view of a first light-emitting module according to an exemplary embodiment of the present invention. FIG. 13B illustrates a perspective view of a second light-emitting module according to an exemplary embodiment of the present invention. FIG. 14 illustrates first and second light-emitting modules of an LCD having a backlight assembly according to an exemplary embodiment of the present invention.

Referring to FIG. 12, a first wiring unit (973a and 973a') may include a first region 973a and a second region 973a', and a second wiring unit (973b and 973b') may include a first region 973a and a second region 973b'. The first regions 973a and 973b may extend in the same direction as third and fourth wiring units 977a and 977b. The second regions 973a' and 973b' may extend in a direction substantially perpendicular to the direction in which the third and fourth wiring units 977a and 977b extend.

Referring to FIG. 13A, the first wiring unit (973a and 973a') of a first light-emitting module 970a may be connected to the third wiring unit 977a, in which the wires of a plurality of light-emitting devices 971a mounted on the first supporting unit 972a are disposed. The first wiring unit (973a and 973a') may be folded along the folding line FL, thereby defining the first region 973a extending in the same direction as the third wiring unit 977a and the second region 973a' extending in the direction perpendicular to the direction in which the third wiring unit 977a extends. For example, the first region 973a of the first wiring unit (973a and 973a') may extend in the same direction as the third wiring unit 977a, e.g., may extend in parallel with the third wiring unit 977a. The second region 973a' of the first wiring unit (973a and 973a') may extend downwardly from the folding line FL and may extend in the direction perpendicular to the direction in which the third wiring unit 977a extends.

Referring to FIG. 13B, the second wiring unit (973b and 973b') of a second light-emitting module 970b may be connected to the fourth wiring unit 977b, in which the wires of a plurality of light-emitting devices 971b mounted on the second supporting unit 972b are disposed. The second wiring unit (973b and 973b') may be folded along the folding line FL, thereby defining the first region 973b extending in the same direction as the fourth wiring unit 977b and the second region 973b' extending in the direction perpendicular to the direction in which the fourth wiring unit 977b extends. The second wiring unit (973b and 973b') has substantially the same structure as the first wiring unit (973a and 973a').

Referring to FIG. 14, at least one of first and second module bases 980a and 980b for forming first and second light-emitting modules of an LCD may be U-shaped according to an exemplary embodiment of the present invention.

For example, the first module base 980a may include a first supporting base 981a for forming the first supporting unit 972a, a third wiring base 987a for forming the third wiring unit 977a, and a first wiring base 983a for forming the first wiring unit (973a and 973a'). The first connection terminal 974a may be formed using a first connection terminal base 984a. For example, a first folding line FL1 may be formed between the first supporting base 981a and the third wiring base 987a so that the first supporting unit 972a and the third wiring unit 977a can form an L-shaped structure together. A second folding line FL2 may be formed at an inclination with the first wiring base 983a so that the first wiring unit (973a and 973a) can have the first region 973a extending in the same direction as the third wiring unit 977a and the second region 973a' extending in the direction perpendicular to the direction in which the third wiring unit 977a extends.

In an exemplary embodiment, the second module base 980b may include a second supporting base 981b for forming the second supporting unit 972b of FIG. 13B, a fourth wiring base 987b for forming the fourth wiring unit 977b of FIG. 13B, and a second wiring base 983b for forming the second wiring unit (973b and 973b') of FIG. 13B. A second connection terminal base 984b and third and fourth folding lines FL3 and FL4 are substantially the same as the first connection terminal base 984a and the first and second folding lines FL1 and FL2, respectively.

In an exemplary embodiment, the first and second module bases 980a and 980b can be U-shaped. In an exemplary embodiment, one of the first and second module bases 980a and 980b may be U-shaped. When the first and second module bases 980a and 980b are respectively U-shaped, the space on a PCP for forming first and second light-emitting modules can be reduced.

Although the exemplary embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A backlight assembly comprising:
a waveguide plate guiding light;
a first light-emitting module disposed on a first side of the waveguide plate, the first light-emitting module including a plurality of first light-emitting blocks;
a second light-emitting module disposed on a second side of the waveguide plate, the second light-emitting module including a plurality of second light-emitting blocks; and
a plurality of optical drivers controlling luminance levels of the first light-emitting blocks and the second light-emitting blocks, wherein at least one of the first light-emitting blocks, at least one of the second light-emitting blocks, and at least one of the optical drivers are electrically connected to each other, wherein a first end of the at least one first light-emitting block is electrically connected to the at least one optical driver, a second end of the at least one first light emitting block is connected to a first end of the at least one second light-emitting block, and a second end of the at least one second light-emitting block is electrically connected to the at least one optical driver, wherein the electrical connection between the second end of the at least one first light emitting block and the first end of the at least one second light-emitting block is not through the at least one optical driver and traverses across the waveguide plate, wherein the electrical connection does not pass through a ground, and wherein a voltage provided by the at least one optical driver is supplied to the at least one first light-emitting block through the at least one second light-emitting block.

2. The backlight assembly of claim 1, wherein at least one of the first light-emitting blocks, at least one of the second light-emitting blocks, and at least one of the optical drivers are connected to each other as a string.

3. The backlight assembly of claim 1, wherein:
each of the first and second light-emitting modules includes first and second connection terminals electrically connected to the first light-emitting blocks and the second light-emitting blocks; and
the first and second connection terminals are electrically connected by a connection unit, wherein the connection unit is on an optical driver, and connects an anode terminal of the first connection terminal to a cathode terminal of the second connection terminal, or a cathode terminal of the first connection terminal to an anode terminal of the second connection terminal.

4. The backlight assembly of claim 1, wherein:
a light-emitting group includes the first and second light-emitting blocks electrically connected to each other, each of the first light-emitting blocks and the second light-emitting blocks includes a plurality of light-emitting devices connected in series.

5. The backlight assembly of claim 4, wherein the light-emitting devices are light-emitting diodes (LEDs).

6. The backlight assembly of claim 1 wherein:
each of the first light-emitting blocks includes a plurality of light-emitting devices disposed in the first light-emitting module;
each of the second light-emitting blocks includes a plurality of light-emitting devices disposed in the second light-emitting module;

the first light-emitting module includes a first supporting unit on which the light-emitting devices of each of the first light-emitting blocks are formed and a first wiring unit in which wires of the light-emitting devices of each of the first light-emitting blocks are formed;

the second light-emitting module includes a second supporting unit on which the light-emitting devices of each of the second light-emitting blocks are formed and a second wiring unit in which wires of the light-emitting devices of each of the second light-emitting blocks are formed; and the first and second supporting units face each other.

7. The backlight assembly of claim 6, wherein:
the first and second supporting units extend in a first direction; and
the first and second wiring units extend in a second direction, which is different from the first direction, and are positioned adjacent each other on a same side of the waveguide plate.

8. The backlight assembly of claim 6, wherein the first wiring unit is disposed behind the waveguide plate.

9. The backlight assembly of claim 6, wherein the first wiring unit is perpendicularly coupled to one end of the first supporting unit.

10. The backlight assembly of claim 6, wherein:
the first light-emitting module further includes a third wiring unit electrically connecting the light-emitting devices formed on the first supporting unit and the wires in the first wiring unit;
the second light-emitting module further includes a fourth wiring unit electrically connecting the light-emitting devices formed on the second supporting unit and the wires in the second wiring unit; and
the third and fourth wiring units are disposed behind the waveguide plate.

11. The backlight assembly of claim 10, wherein: the third wiring unit and the first supporting unit form an L-shaped structure; and the fourth wiring unit and the second supporting unit form the L-shaped structure.

12. The backlight assembly of claim 6, wherein a width of the first and second supporting units corresponds to a width of the light-emitting devices formed on the first supporting unit and the light-emitting devices formed on the second supporting unit.

13. The backlight assembly of claim 10, wherein:
the third and fourth wiring units extend in a first direction;
the first wiring unit includes a first region connected to one end of the third wiring unit and extending in the first direction and a second region extending in a second direction, which is different from the first direction; and
the second wiring unit includes a first region connected to one end of the fourth wiring unit and extending in the first direction and a second region extending in the second direction, wherein the second regions of the first and second wiring units are positioned adjacent each other on a same side of the waveguide plate.

14. The backlight assembly of claim 13, wherein:
each of the first and second wiring units includes a folded portion; and
a direction in which each of the first and second wiring units extends changes at the folded portion.

15. The backlight assembly of claim 1, wherein current flows from the second end of the at least one first light emitting block directly to the first end of the at least one second light-emitting block.

16. The backlight assembly of claim 1, wherein an end of the electrical connection is positioned at the first side of the waveguide plate, and another end of the electrical connection is positioned at the second side of the waveguide plate, wherein the first side of the waveguide plate and at the second side of the waveguide plate are opposite to each other.

17. The backlight assembly of claim 1, wherein the second end of the at least one first light emitting block is positioned at the first side of the waveguide plate, and the first end of the at least one second light-emitting block is positioned at the second side of the waveguide plate.

18. A liquid crystal display (LCD) comprising:
a liquid crystal panel displaying an image;
a waveguide plate disposed behind the liquid crystal panel and guiding light to the liquid crystal panel; and
a backlight assembly including a first light-emitting module, disposed on a first side of the waveguide plate and including a plurality of first light-emitting blocks, a second light-emitting module, disposed on a second side of the waveguide plate and including a plurality of second light-emitting blocks, and a plurality of optical drivers, controlling luminance levels of the first light-emitting blocks and the second light-emitting blocks, wherein at least one of the first light-emitting blocks, at least one of the second light-emitting blocks, and at least one of the optical drivers are electrically connected, wherein a first end of the at least one first light-emitting block is electrically connected to the at least one optical driver, a second end of the at least one first light emitting block is connected to a first end of the at least one second light-emitting block, and a second end of the at least one second light-emitting block is electrically connected to the at least one optical driver, wherein the electrical connection between the second end of the at least one first light emitting block and the first end of the at least one second light-emitting block is not through the at least one optical driver and traverses across the waveguide plate, wherein the electrical connection does not pass through a ground, and wherein a voltage provided by the at least one optical driver is supplied to the at least one first light-emitting block through the at least one second light-emitting block.

19. The LCD of claim 18, wherein at least one of the first light-emitting blocks, at least one of the second light-emitting blocks, and at least one of the optical drivers are connected as a string.

20. The LCD of claim 18, wherein:
each of the first and second light-emitting modules includes first and second connection terminals electrically connected to the first light-emitting blocks and the second light-emitting blocks; and
the first and second connection terminals are electrically connected by a connection unit, wherein the connection unit is on an optical driver, and connects an anode terminal of the first connection terminal to a cathode terminal of the second connection terminal, or a cathode terminal of the first connection terminal to an anode terminal of the second connection terminal.

21. The LCD of claim 18, wherein:
a light-emitting group includes the first and second light-emitting blocks electrically connected to each other;
each of the first light-emitting blocks and the second light-emitting blocks includes a plurality of light-emitting devices connected in series.

22. The LCD of claim 18, wherein:
each of the first light-emitting blocks includes a plurality of light-emitting devices disposed in the first light-emitting module;

each of the second light-emitting blocks includes a plurality of light-emitting devices disposed in the second light-emitting module;
the first light-emitting module includes a first supporting unit on which the light-emitting devices of each of the first light-emitting blocks are formed and a first wiring unit in which wires of the light-emitting devices of each of the first light-emitting blocks are formed;
the second light-emitting module includes a second supporting unit on which the light-emitting devices of each of the second light-emitting blocks are formed and a second wiring unit in which wires of the light-emitting devices of each of the second light-emitting blocks are formed; and
the first and second supporting units face each other.

23. The LCD of claim 22, wherein:
the first and second supporting units extend in a first direction; and
the first and second wiring units extend in a second direction, which is different from the first direction, and are positioned adjacent each other on a same side of the waveguide plate.

24. The LCD of claim 22, wherein:
the first light-emitting module further includes a third wiring unit electrically connecting the light-emitting devices formed on the first supporting unit and the wires in the first wiring unit;
the second light-emitting module further includes a fourth wiring unit electrically connecting the light-emitting devices formed on the second supporting unit and the wires in the second wiring unit; and
the third and fourth wiring units are disposed behind the waveguide plate.

25. The LCD of claim 24, wherein:
the third and fourth wiring units extend in a first direction;
the first wiring unit includes a first region connected to one end of the third wiring unit and extending in the first direction and a second region extending in a second direction, which is different from the first direction; and
the second wiring unit includes a first region connected to one end of the fourth wiring unit and extending in the first direction and a second region extending in the second direction, wherein the second regions of the first and second wiring units are positioned adjacent each other on a same side of the wavelength plate.

26. The LCD of claim 18, wherein an end of the electrical connection is positioned at the first side of the waveguide plate, and another end of the electrical connection is positioned at the second side of the waveguide plate, wherein the first side of the waveguide plate and at the second side of the waveguide plate are opposite to each other.

27. The LCD of claim 18, wherein the second end of the at least one first light emitting block is positioned at the first side of the waveguide plate, and the first end of the at least one second light-emitting block is positioned at the second side of the waveguide plate.

28. A method of manufacturing a liquid crystal display, the method comprising:
providing a liquid crystal panel displaying an image, and a waveguide plate to disposed behind the liquid crystal panel and guiding light to the liquid crystal panel;
disposing a first light-emitting module and a second light-emitting module on opposite sides of the waveguide plate, the first light-emitting module including a plurality of first light-emitting blocks providing light, and the second light-emitting module including a plurality of second light-emitting blocks providing light; and
forming a plurality of optical drivers controlling luminance levels of the first light-emitting blocks and the second light-emitting blocks, wherein at least one of the first light-emitting blocks, at least one of the second light-emitting blocks, and at least one of the optical drivers are electrically connected to each other, wherein a first end of the at least one first light-emitting block is electrically connected to the at least one optical driver, a second end of the at least one first light emitting block is connected to a first end of the at least one second light-emitting block, and a second end of the at least one second light-emitting block is electrically connected to the at least one optical driver, wherein the electrical connection between the second end of the at least one first light emitting block and the first end of the at least one second light-emitting block is not through the at least one optical driver, and traverses across the waveguide plate, wherein the electrical connection does not pass through a ground, and wherein a voltage provided by the at least one optical driver is supplied to the at least one first light-emitting block through the at least one second light-emitting block.

29. The method of claim 28, wherein at least one of the first light-emitting blocks, at least one of the second light-emitting blocks, and at least one of the optical drivers are connected to each other as a string.

30. The method of claim 28, wherein:
each of the first light-emitting blocks includes a plurality of light-emitting devices disposed in the first light-emitting module;
each of the second light-emitting blocks includes a plurality of light-emitting devices disposed in the second light-emitting module wherein the first light-emitting module includes a first supporting unit on which the light-emitting devices of each of the first light-emitting blocks are formed and a first wiring unit in which wires of the light-emitting devices of each of the first light-emitting blocks are formed;
the second light-emitting module includes a second supporting unit on which the light-emitting devices of each of the second light-emitting blocks are formed and a second wiring unit in which wires of the light-emitting devices of each of the second light-emitting blocks are formed; and
the first wiring unit is substantially perpendicularly coupled to one end of the first supporting unit, wherein the first and second wiring units extend in a same direction, and are positioned adjacent each other on a same side of the waveguide plate.

31. The method of claim 30, wherein:
the first light-emitting module further includes a third wiring unit electrically connecting the light-emitting devices formed on the first supporting unit and the wires in the first wiring unit; the second light-emitting module further includes a fourth wiring unit electrically connecting the light-emitting devices formed on the second supporting unit and the wires in the second wiring unit; and
the third and fourth wiring units are disposed behind the waveguide plate.

32. The method of claim 31, wherein:
each of the first and second wiring units is folded along a folding line;
one end of the first wiring layer is connected to one end of the third wiring unit;

a direction in which the first wiring layer extends changes from a first direction to a second direction at the folding line;

one end of the second wiring layer is connected to one end of the fourth wiring unit; and a direction in which the second wiring layer extends changes from the first direction to the second direction at the folding line.

33. The method of claim 28, wherein:

disposing the first and second light-emitting modules comprises:

providing a first module base, including a first supporting base for forming the first supporting unit, a first wiring base for forming the first wiring unit, and a third wiring base for forming the third wiring unit, and a second module base, including a second supporting base for forming the second supporting unit, a second wiring base for forming the second wiring unit, and a fourth wiring base for forming the fourth wiring unit;

forming the first supporting unit by folding the first module base along a first folding line formed between the first supporting base and the third wiring base;

forming the second supporting unit by folding the second module base along a second folding line formed between the second supporting base and the fourth wiring base;

forming first and second regions of the first wiring unit by folding the first wiring base along a folding line formed on an arbitrary portion of the first wiring base; and forming first and second regions of the second wiring unit by folding the second wiring base along a folding line formed on an arbitrary portion of the second wiring base, wherein the first regions of the first and second wiring units extend in a first direction, and the second regions of the first and second wiring units extend in a second direction, and wherein the second regions of the first and second wiring units are positioned adjacent each other on a same side of the waveguide plate.

34. The method of claim 28, wherein an end of the electrical connection is positioned at one of the opposite sides of the waveguide plate, and another end of the electrical connection is positioned at the other of the opposite sides of the waveguide plate.

35. The method of claim 28, wherein the second end of the at least one first light emitting block is positioned at one of the opposite sides of the waveguide plate, and the first end of the at least one second light-emitting block is positioned at the other of the opposite sides of the waveguide plate.

* * * * *